April 25, 1950     W. L. FREY     2,505,536

PASTRY FORMING DEVICE

Filed Oct. 13, 1947

INVENTOR.
WALTER L. FREY
BY Joseph B. Gardner
his atty.

Patented Apr. 25, 1950

2,505,536

UNITED STATES PATENT OFFICE 2,505,536

PASTRY FORMING DEVICE

Walter L. Frey, Oakland, Calif.

Application October 13, 1947, Serial No. 779,556

3 Claims. (Cl. 99—430)

This invention relates to forms about which pastry articles may be shaped.

An object of the invention is to provide a form for rapidly and uniformly shaping a shell-like pastry from and on which the latter form may be cooked in situ.

Another object of the invention is to provide a pastry forming device comprising a plurality of interengageable parts cooperative, when brought together, to separate from the essential body of dough any excess that may have been included therein.

A further object of the invention is to provide a form of the character described which, although enclosing a substantial proportion of a dough mass, provides sufficient exposure of the dough so that the latter may be rapidly, thoroughly and uniformly cooked or baked.

Still another object of the invention is to provide a multi-part forming device of the class referred to in which the interengagement of mold parts produces a desirable compression of areas of the dough mass so as to insure a retention of the general shape and size of the compressed areas during the cooking process.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claims.

Referring to the drawing.

Figure 1:
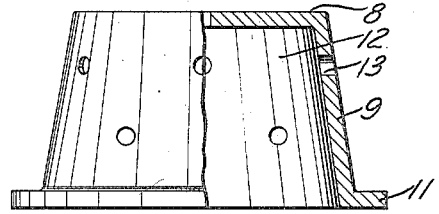
Figure 1 is a view, partly in side elevation and partly in vertical section showing the core element of the forming device of my invention.
Figure 4:
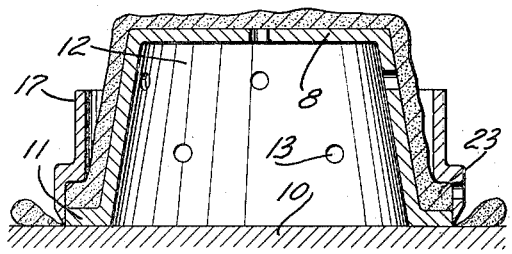
Figure 4 is a vertical sectional view of the core element and ring member in interengaged relation to effect formation of the pastry form rim and to divest the form device of excess dough.
Figure 6:
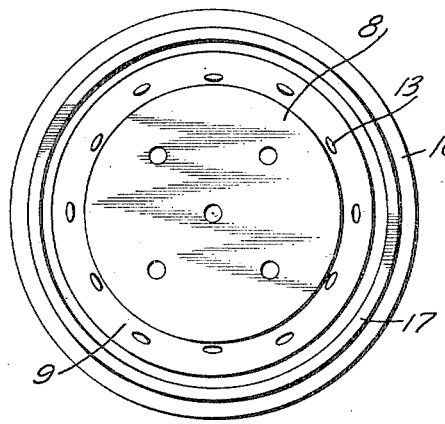
Figure 6 is a top plan view of the structure shown in Figure 5.

In carrying out my invention I provide a core element, shown separately in Figure 1, which is a cast or die-formed preferably metallic unit having a bottom 8, a frusto-conical perimetral wall 9 extending therefrom and a flange 11 paralleling the bottom 8 and projecting radially from the wall 9 at the perimetral edge of the latter of largest diameter. The flange 11 forms a base to provide for seating of the core element on a flat supporting surface 10 as shown in Figure 4. The recess 12 defined by the bottom 8 and wall 9 preferably conforms in shape with the external contour of the core element so that a uniform thickness of wall is provided and piercing the said wall at dispersed points, I provide a plurality of apertures 13 whose function will be explained presently.

The exterior of the core element is adapted to receive a coating 14 of pastry batter, dough or the like edible substance which is preferably of such plastic consistency as permits its formation, manually, in a self-supporting surface layer blanketing the core element above the plane of its face engaging the supporting surface 10. The use of a comparatively thick dough or the like is preferred due to the ease with which it may be applied to the core element but coating materials of softer consistency may also be employed if desired, the application thereof being accomplished by dipping the core element into a pool of the selected material or by smearing the material in a suitably thick coating, by means of a spoon or spatula, over the exterior of the core element.

Figure 2:
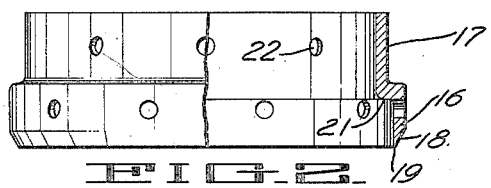
Figure 2 is a view, partly in side elevation and partly in vertical section showing the ring member of the forming device of my invention.
Figure 3:
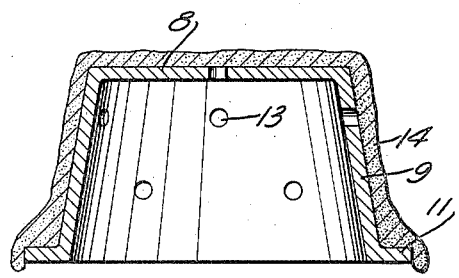
Figure 3 is a vertical sectional view showing the core element with a coating of pastry dough thereon.
Figure 5:
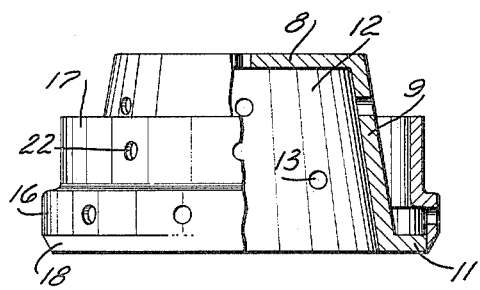
Figure 5 is a view similar to Figure 4 showing the interengaged core element and ring member alone.

The core element, so prepared with its exterior coating of edible material, possesses the condition shown in Figure 3 and is thereupon placed on the supporting surface 10 which may conveniently be the bottom of a baking pan used in transporting the prepared forming device from the work table to a bake oven in which the preferred process of cooking the dough or other coating material may be carried out. Prior to the actual baking, I apply to the core element the cutting and forming device shown separately in Figure 2 and comprising a preferably metallic ring having a lower skirt portion 16 and an integral and concentric upper waist portion 17. The inner diameter of the skirt portion 16 is only slightly in excess of the external diameter of the flange 11 and by providing the lower face of the skirt with a bevel 18 a sharp cutting edge 19 is formed bordering the bore of the skirt. The waist portion 17 is of considerably smaller diameter than the skirt portion and forms a shoulder 21 at the junction of the respective bores of the waist portion and skirt. Apertures 22 relatively dispersed around the periphery of the ring are equivalent to and serve the same purpose as the apertures 13 as will be presently explained. The ring is held concentrically with the coated core element above the latter and is lowered to cause the skirt 16 to telescope over the periphery of the flange 11 thus shearing from the mass of dough any excess thereof which may be extending radially outwardly beyond the said periphery of the flange. Simultaneously with the shearing off of the excess dough, as illustrated in Figure 4, the shoulder 21 will descend to a prescribed point above the flange 11 and thereby compress a peripheral zone of the dough to create a rim 23 of cross-sectional form defined by the interrelationship of the shoulder 21, the inner surface of the skirt 16 and the upper transaxial surface of the flange 11. Such compression of the dough is desirable in rendering the dough sufficiently dense that it will, upon being baked or otherwise cooked, form a rim which will prevent deformation during baking and will at the same time possess a high degree of resistance to breakage under the stresses of normal handling but yet will not be so tough or hard as to detract from its edible qualities. After the surplus sheared-off dough has been removed and with the ring left in its engaged position with the core element, the assembly is placed in the oven and subjected to the proper baking heat to bake the coating 14. During such cooking or baking considerable steam will be generated in the edible coating material and it is partly to permit free escape of said steam and partly to allow heat to uniformly penetrate through the ring and the core element to the dough that the apertures 13 and 22 are provided. Since the rim portion 23 has the greatest unit bulk of the dough coating, a row of vent apertures is provided in the skirt 16 directly overlying the rim to provide the shortest possible escape path for the steam ejected by the dough in this area. After being in the oven or otherwise subjected to cooking heat for a desired length of time, the forming device is removed as a unit and allowed to cool sufficiently to permit comfortable handling thereof in the preparation of a succeeding pastry article. At the end of such cooling period it will be found that the cooked dough or batter has shrunken sufficiently away from the core element and ring as to be readily separated therefrom.

The resulting pastry product is, in this instance, a recessed shell commonly referred to as a "Patty cup" in which meat, vegetable or dessert concoctions may be served. Such shells, while being suitably tender or readily frangible so as to facilitate proper mastication thereof, nevertheless should be sufficiently resistant to crushing to withstand the normal crushing pressures imposed thereon during the processes of handling. The shell formed by the device of my invention due primarily to the provision therein of the compressed marginal rim 23 is fully capable of withstanding crushing pressures of abnormal degrees without fracturing or fragmenting.

Figure 7:
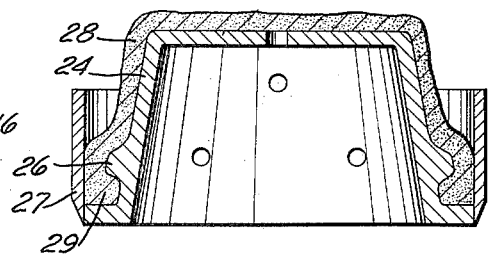
Figure 7 is a vertical sectional view of a modified form of the device of my invention showing a quantity of dough embraced thereby.

In Figure 7 I have illustrated a modified form of my invention in which the core element is provided on its external frusto-conical surface 24 with a peripheral bead 26 formed as a protrusion of the core element wall and overlying the flange 11 in vertically spaced relation therewith. In this form of the invention the ring 27 is of straight tubular form but is arranged to cooperate with the rim 11 in shearing off excess dough or batter as was previously explained. Here it will be seen that the relatively confronting surfaces of the rim 11, the bead 26 and the ring 27 define a circumferential zone of increased cross-sectional area around the dough mass 28 which forms the thickened rim portion 29 of the pastry shell.

I claim:

1. A forming device for a pastry article comprising a core element having substantially cylindrical side wall and an end wall about which a mass of dough may be primarily shaped and further having a marginal flange opposite said end wall forming a base on which the core element may rest on a supporting surface, a sleeve member having substantially cylindrical side walls engageable with said core element and having a flanged portion thereof overlying said core element flange and between which flanges a quantity of said dough mass may be compressed, and means on said sleeve element engageable and cooperative with said flange for shearing therebetween excess dough of said mass from the latter so as to separate said excess dough from said mass.

2. A forming device for a pastry article comprising a core element about which a mass of dough may be primarily shaped and having a marginal flange forming a base on which the core element may rest on a supporting surface, said core element being further provided with a peripheral bead protruding therefrom and overlying said flange, a sleeve member engageable with said core member and provided with means operative upon said engagement to shear excess dough from said mass thereof, and surfaces of said flange, bead and sleeve cooperating to define a rim-forming recess for said pastry article.

3. A forming device for a pastry article comprising a substantially cylindrical perforate core element about which a mass of dough may be preliminarily and manually shaped, said core element having a marginal flange forming a base on which the core element may rest on a supporting surface, a substantially cylindrical perforate sleeve member arranged to overlie said core element and having a sharp cutting edge cooperative with a surface of said flange to shear from said mass of dough any excess amount thereof which extends beyond said flange surface, and said sleeve further having thereon a surface substantially paralleling said flange to define, in conjunction with surfaces of the flange and sleeve a recess in which dough may be secondarily shaped to form a rim for said pastry article and in which said dough may be subjected to compressive stress between said flange and the sleeve surface overlying the flange during the action of engaging said sleeve member with said core element.

WALTER L. FREY.

REFERENCES CITED

The following references are of record in the file of this patent:

UNITED STATES PATENTS

| Number | Name | Date |
|---|---|---|
| 898,478 | Jackson | Sept. 15, 1908 |
| 1,510,279 | Huth et al. | Sept. 30, 1924 |
| 1,543,380 | Harrell | June 23, 1925 |
| 2,007,263 | Wait | July 9, 1935 |
| 2,232,633 | Richardson | Feb. 18, 1941 |
| 2,255,089 | Simonds | Sept. 9, 1941 |
| 2,346,839 | Harriss et al. | Apr. 18, 1944 |

FOREIGN PATENTS

| Number | Country | Date |
|---|---|---|
| 135,467 | Great Britain | May 13, 1920 |